March 21, 1939.  L. W. GODDU  2,151,509
METHOD OF MAKING LENSES
Filed May 13, 1935  2 Sheets-Sheet 1
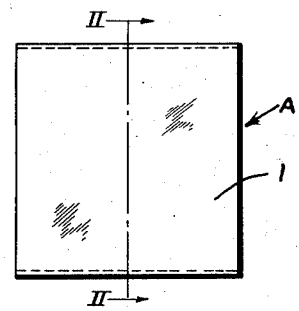
FIG. I
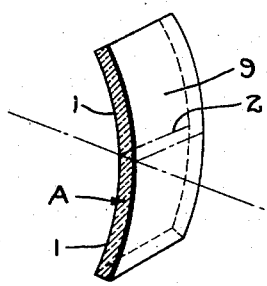
FIG. II
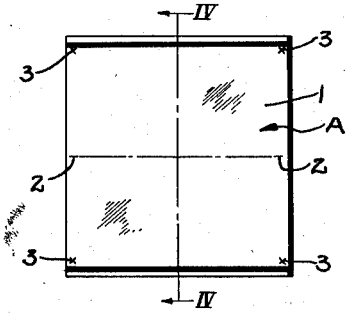
FIG. III
FIG. IV
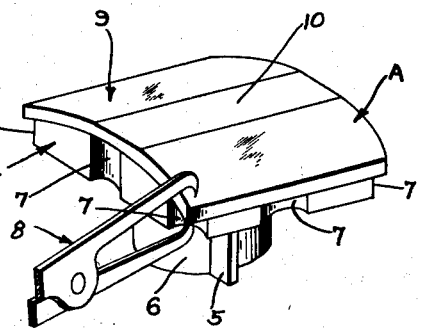
FIG. V
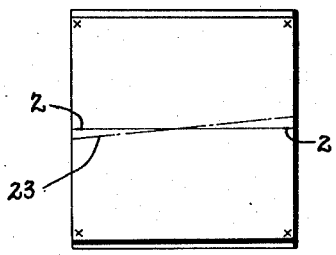
FIG. VI
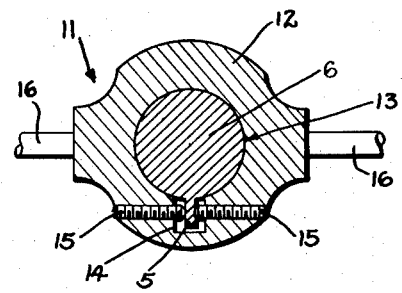
FIG. VII
INVENTOR
LLOYD W. GODDU
BY
Harry H. Styll
ATTORNEY March 21, 1939.   L. W. GODDU   2,151,509
METHOD OF MAKING LENSES
Filed May 13, 1935   2 Sheets-Sheet 2
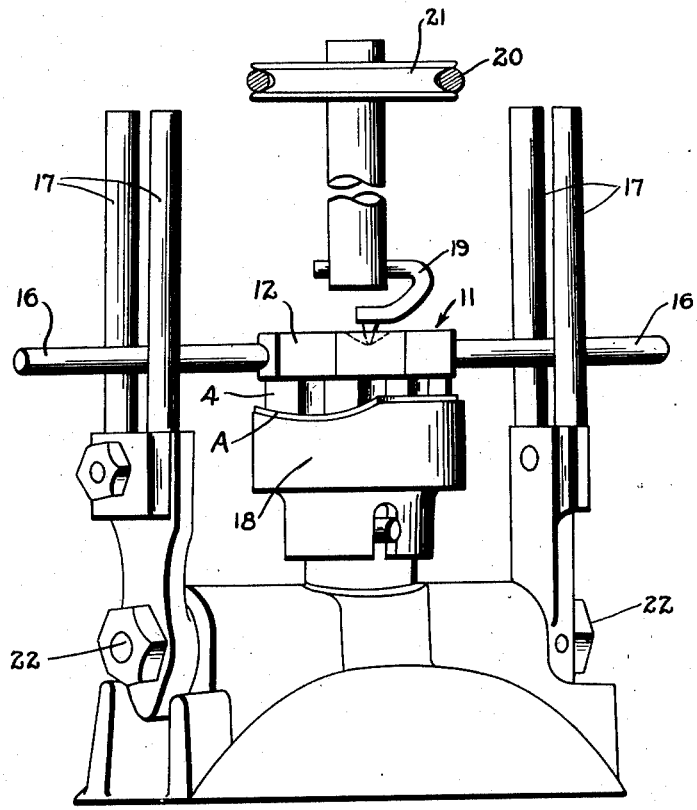
FIG. VIII
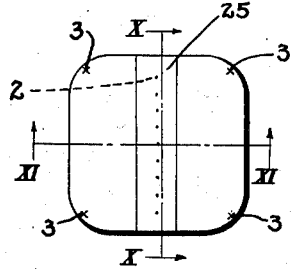
FIG. IX
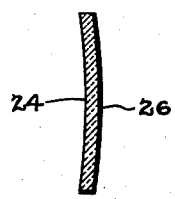
FIG. X
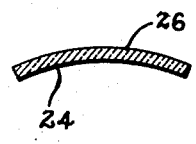
FIG. XI
INVENTOR
LLOYD W. GODDU
BY
Harry H. Styll
ATTORNEY Patented Mar. 21, 1939

2,151,509

UNITED STATES PATENT OFFICE 2,151,509

METHOD OF MAKING LENSES

Lloyd W. Goddu, Southbridge, Mass., assignor to American Optical Company, Southbridge, Mass., a voluntary association of Massachusetts Application May 13, 1935, Serial No. 21,213

6 Claims. (Cl. 51—278)

This invention relates in general to lenses and more particularly to improved means and method of making bi-cylindrical or bi-toric lenses.

One of the principal objects of the invention is to provide improved means and method of making an ophthalmic lens of the bi-cylindrical or bi-toric type from a single piece of lens medium wherein the axes of the opposed cylindrical or toric surfaces of the finished lens will be accurately and positively aligned, or otherwise positively located relative to each other.

Another object is to provide improved means and method of making lenses of the above character wherein the related positions of the axes of the surfaces being formed on the lenses may be definitely controlled during the process of making such lenses.

Another object is to provide positive means for shifting the positions of the axes of the surfaces of such lenses relative to each other during the abrading operations.

Another object is to provide simple, efficient and economical means and method of making lenses of the above character.

Other objects and advantages of the invention will become apparent from the following description taken in connection with the accompanying drawings, and it will be apparent that many changes may be made in the details of construction, arrangement of parts and steps of the process shown and described without departing from the spirit of the invention as expressed in the accompanying claims. I, therefore, do not wish to be limited to the exact details of construction and steps of the process shown and described, as the preferred forms only have been set forth by way of illustration.

Referring to the drawings:

Fig. I is a front view of a finished lens of the bi-cylindrical type;

Fig. II is a sectional view taken on line II—II of Fig. I and shown partially in perspective;

Fig. III is a rear view of the semi-finished blank showing a step in the process of manufacture;

Fig. IV is a sectional view taken on line IV—IV of Fig. III and looking in the direction indicated by the arrows;

Fig. V is a perspective view showing the lens blank attached to a lens block and illustrating another step in the process of manufacture;

Fig. VI is a plan view of the blank illustrating another step in the process of manufacture;

Fig. VII is a fragmentary sectional view showing the lens block attachment to the block holder and showing the means for varying the axes of the surfaces of the lens during the abrading operations;

Fig. VIII is a diagrammatic view of a machine used in performing another step of the process of manufacture;

Fig. IX is a front view of a semi-finished blank for a lens of the bi-toric type;

Fig. X is a sectional view taken on line X—X of Fig. IX; and

Fig. XI is a sectional view taken on line XI—XI of Fig. IX.

Lenses of the bi-cylindrical or bi-toric type are not unknown to the prior art but there has never been devised a thoroughly satisfactory method of producing them. A most important factor in the production of these lenses is, of course, that the axes be very accurately located with respect to each other. The most common method which has been employed in attempting to produce lenses of this kind has been to attach the lens blank to a lens block in the ordinary manner by the use of pitch or other suitable means and grind the cylindrical or toric surface on one side, then block the blank with its other side up and with its axis as nearly in alignment with the tool as possible, and then grind the second cylindrical or toric surface. As will be readily apparent, it is extremely difficult, if not impossible, to produce a lens with its axes accurately and properly aligned by this method. The matter of aligning the lens with one surface ground on it so that the other surface would be in proper alignment was at best a more or less hazardous and guesswork proposition. If, upon gauging, it was found that the surfaces were being formed off axes the block had to be heated to soften the pitch and the lens was then turned an amount thought to be sufficient to align the axes. The pitch was then allowed to cool and harden to again hold the lens in adjusted relation with the block. This guesswork method of aligning the axes often had to be repeated several times during the forming of the lens and in many instances when the lens was completed the axes were found to be out of line. This of course rendered the lens impractical for use.

Another method of forming a bi-cylindrical or bi-toric lens was to make the lens of two separate blanks each having their contiguous surfaces formed to the same spherical curves, one being convex and the other concave, so that they would fit each other. The outer surfaces were formed by blocking the blanks up separately and then grinding their sides opposite the spherical curves to the toric curves desired for the finished lens. The two blanks were then fitted together with a cementitious material between the spherical surfaces and before the cementitious material was allowed to harden the axes of the toric surfaces were aligned by moving one blank relative to the other. The cementitious material was then allowed to harden to hold the blanks in permanent alignment. This procedure, although more desirable than the first, required extra abrading and cementing operations and was in general very expensive.

The prime object, therefore, of the present invention is to overcome the above difficulties by providing improved means and method of forming lenses of the above character of single pieces of lens medium wherein the axes of the opposed cylindrical or toric surfaces may be accurately and positively aligned without having to reblock the lens or having to form and cement separate blanks together.

Referring more particularly to the drawings wherein like characters of reference designate like parts throughout the several views, one of the lenses embodying the invention and method of making the same as shown in Figures I to VIII, inclusive, comprises a piece of glass or transparent vitreous material A having a cylindrical surface 1 formed on one side thereof, preferably the concave side, in the usual prior art manner. The lens blank thus formed is then blocked with its minus side towards the block and a surface 10 is ground and polished on its exposed face. This surface is formed to such a depth as to reduce the central portion of the blank to nearly the specified thickness of the finished lens, great care being taken to keep the lens as free from prism as possible. This is to obtain optical properties at the center of the lens. The blank is then removed from the block, cleaned and the physical axis thereof marked on the minus side as indicated at 2. Suitable gauge points 3 are then located and marked on said surface as indicated in Fig. III. These gauge points are on the 45° diagonals to the physical axis of the lens and are preferably equidistant from the physical axis 2 and the optical center point of the lens. The position of the axis can be located by an instrument which is known commercially as an axometer. The gauge points 3 may be located by a suitable template or by mechanical means designed for this purpose.

The lens blank thus formed, as shown in Figs. III to V, is then attached to a special adjustable lens block 4 by pitch or other suitable attaching means with the minus or concave side 1 towards the block. Care is taken that the lens blank is attached centrally of the block and with the axis 2 at right angles to a lug 5 formed on the round supporting hub 6 of the block. The lens blank supporting portion of the block 4 is cut away as indicated at the points 7 to expose the gauge points 3 and axis locating points 2 so that the thickness at said points may be checked by suitable gauge means 8 during the forming of the second surface 9 of the lens.

The second side or surface 9 of the blank is then hand ground by a commercially known hand rocking process to reduce the thickness of the blank, extreme care being taken during this operation to keep the lens free from prism by constantly checking the thickness at the four gauging points 3. The thicknesses at the four gauging points 3 should all be exactly the same and if this is done accurately the polished surface 10 will close up and form a line exactly parallel to the axis 2 of the first surface 1. This polished line should be left about 5 mm. wide when the hand rocking operation is completed.

The lens block with the lens blank thereon is then placed in a special holder 11 having a portion 12 formed with an opening 13 therein to receive the round hub 6 of the block 4. The portion 12 also has a slot 14 communicating with the opening 13 to receive the lug 5. A pair of adjustable screws 15, located on the opposite sides of the slot 14, are adapted to provide means for adjustably securing the block 4 in the holder 11. The portion 12 is provided on its opposite sides with aligned horizontally extending arms 16 adapted during use to fit between the diametrically opposed spaced pivoted arms 17 of an abrading machine such as shown in Fig. VIII and which is used in completing the surface 9 of the lens. This machine is known commercially as a cylinder or toric lens grinding machine and comprises broadly a lens grinding tool 18 having an abrading surface thereon of the required curvature to be formed on the surface 9 of the lens. The lens blank A is moved over the surface of the abrading tool by a crank member 19 engaging in an opening in the block 4 and driven by a belt and pulley 20 and 21 or other suitable means. The tool 18 and entire attachment may be rotated by any suitable means known to the prior art. The spaced arms 17 are pivoted on the opposite sides of the tool 18 as indicated at 22 and are adapted to hold the lens blank A in proper axial relation with the tool during the abrading operations in the usual prior art manner.

After the lens blank has been abraded for a short time the holder and lens blank are removed from the machine, care being taken not to remove the block 4 from the holder 12, and the thickness at the four gauging points 3 are checked. It will probably be found that two diagonally opposite corners will be thicker than the other two diagonally opposite corners. This will be evidenced by the fact that the polished line produced by the closing in of the surface 10 will not be parallel to the axis 2 of the first or minus side of the blank. This shows that the two physical axes 2 and 23 of the two surfaces, as illustrated in Fig. VI, are not in exact alignment.

To alter the positions of the axes the screw 15 on one side of the lug 5 is loosened and the screw on the other side is tightened. This causes the lens to rotate in the holder wherein continued abrading will cause the axis 23 of the surface 9 to shift and align with the axis 2 of the first surface.

By constantly gauging the four corners at the points 3 and making the necessary adjustments, the polished line formed by the surface 10 will close out directly over and parallel to the axis 2 of the first or minus side of the lens. The last part of the abrading operation should, of course, be done with fine abrasive such as emery or other suitable means, and the lens may then be polished in the usual prior art manner.

If the above procedure has been carried out correctly and carefully, the two axes will be in accurate alignment. This may be checked by finding the resultant axis of the bi-cylindrical or bi-toric lens on an instrument commercially known as an axometer.

In the above description the minus side of the lens is described as being finished first. It is to be understood, however, that there will be cases where it will be advisable to reverse the procedure and finish the plus side first. The procedure thereafter will be the same.

The above procedure specifically sets forth the method of forming a bi-cylindrical lens, such as shown in Figs. I and II, but it is to be understood that lens of the bi-toric type, such as shown in Figs. IX to XI, inclusive, may be formed in a similar manner, the only difference being that the first or minus surface 24 of the lens is ground and polished with the correct toric curve in the usual manner. The lens is then ground and polished on its opposite face as indicated at 25 with the base curve of the plus toric surface to within one-tenth millimeter of the desired center thickness of the finished lens. This surface corresponds with the surface 10 formed on the bi-cylindrical lens, as shown in Fig. V and is formed for the purpose of obtaining good optical properties at the center of the lens so that the physical axis may be located on a suitable axis locating instrument. The physical axis 2 and gauge points 3, are then marked out and the lens is then attached to a special adjustable block 4 in a manner similar to that set forth above for the bi-cylindrical lens, only in this instance a block having a surface curvature as near to the first curvature of the lens as possible is selected. This is to obtain a substantially even layer of pitch between the lens and block so that the lens will be substantially evenly supported throughout its area during the abrading of the second surface.

The lens is then finished in a manner similar to the bi-cylindrical lens, the only difference being that a lap 18 having the proper surface curvature is selected to produce the second toric surface 26 of the lens. If each step of the process is carefully carried out the axes of the two opposed toric surfaces will be in accurate alignment when the lens is finished.

It is to be understood that although applicant has specifically set forth that the axes of the two opposed toric surfaces are preferably formed in aligned relation with each other, the said axes may, by applicant's improved means and method, be formed to any desired and accurately controlled relation with each other.

In locating the position at which the optical center of the lens is to be formed and the positions at which the gauge points 3 relative to said optical center are to be formed, a device having optical means for locating the said points and center may be used. In this instance and when the axes of the opposed toric surfaces are to be aligned, the portions of the lens blank where the points 3 are located and marked will in most instances all have substantially the same refractive powers. This, therefore, enables the said points to be accurately located optically.

From the foregoing description it will be seen that simple, efficient and accurate means and process have been provided whereby a lens of the bi-cylindrical or bi-toric type may be quickly and easily formed from a single piece of lens medium and with the axes of its opposed surfaces in positive and accurate alignment.

Having described my invention, I claim:

1. The process of forming a lens having opposed surfaces that depart from true spherical curvature comprising forming the desired surface on the first side of a piece of lens medium, forming a surface throughout the central area of the second side of the piece of lens medium to substantially the finished center thickness of the lens to produce optical definition through said central area, optically locating the physical axis of the first surface, indicating the position of said physical axis on said surface and abrading the second side of the lens to such a depth and related position with respect to the first surface as to cause the surface on said second side to close in substantially parallel to and in alignment with the indicated axis of the first surface.

2. The process of forming a lens having opposed toric or cylindrical surfaces comprising forming the desired surface on the first side of a piece of lens medium, forming a surface on the central area of the second side of the lens to substantially the base curve of the final surface which is to be formed on said second side and to substantially the finished thickness of the lens, locating and marking the physical axis of the first surface on said surface, abrading the second surface with the desired surface curvature and to such a depth and related position with respect to the first surface as to cause the central area to close in substantially parallel to and in alignment with the axis of the first surface.

3. The process of forming a lens having opposed surfaces that depart from true spherical curvature comprising forming the desired surface on one side of a piece of lens medium, forming an optical surface throughout the central area of the second or opposite side of said piece of lens medium, locating and marking the physical axis on the first surface of the lens, locating and marking gauging points on the 45° diagonals to said physical axis and substantially equidistant from the position at which the optical center of the finished lens is to be located, forming the desired surface on the second side of the piece of lens medium to such a depth and position relative to the first surface as to cause the central area on said second side to close in substantially parallel to and in alignment with the axis of the first surface, said lens being gauged at the indicated gauging points at different intervals during the forming of said second surface and being adjusted relative to its holding means during said abrading to control the actual relation of the opposed surfaces.

4. The process of forming a lens having opposed surfaces that depart from true spherical curvature comprising forming the desired surface on one side of a piece of lens medium, forming a surface on the second side of the piece of lens medium to a curvature substantially equal to the base curve of the surface which is to be formed on said second side and to substantially the center thickness of the finished lens, locating and marking the physical axis of the first surface on said surface, locating gauging points adjacent the peripheral edge of the lens diametrically opposed to the point at which the optical center of the finished lens is to be located and substantially equidistant from said point, blocking the lens blank thus formed with the first surface toward the block and with its physical axis aligned with the block, abrading the second surface of the lens on the exposed face of the blank to cause the central area to close in substantially parallel to and in alignment with the physical axis of the first surface, gauging the edge thickness of the lens at said gauging points during the forming of said second surface to determine the position at which the opposed surfaces are being formed relative to each other, altering the relation of said surface curvatures during the abrading operation by adjusting the position of the lens block relative to the abrading means during said abrading operation to compensate for axial deviations and to cause the opposed axes to shift into alignment with each other during continued abrading and finishing said second surface to the depth required to reduce the lens to its required thickness.

5. The process of forming a lens having opposed surfaces that depart from true spherical curvature comprising forming the desired surface on the first side of a piece of lens medium, forming a surface throughout the central area of the second side of the piece of lens medium to obtain optical definition through said central area, locating and indicating the position of the physical axis of said surface and abrading the second side of the lens to such a depth and related position with respect to the surface on the first side of the piece of lens medium as to cause the surface on said second side to close in substantially parallel to and in alignment with the indicated axis of the first surface.

6. The method of making a bi-toric lens which includes the steps of generating a desired final toric surface on one side of a lens blank, forming an optical surface on the opposite side of said lens blank in a predetermined relation to said final surface in order to predetermine the optical center of the semi-finished bi-toric lens blank, locating positional elements on said final surface which are symmetrically positioned relative to the optical center of said semi-finished blank and with respect to the toric axis of said final surface, and generating a second final toric surface on the side of said blank opposite said first final surface, the axis of which has a predetermined relation with respect to said positional elements.

LLOYD W. GODDU.